(12) United States Patent
Krantz et al.

(10) Patent No.: US 10,897,034 B2
(45) Date of Patent: Jan. 19, 2021

(54) BATTERY FASTENING SYSTEM AND METHOD

(71) Applicant: Ningbo Geely Automobile Research & Development Co., Ltd., Ningbo (CN)

(72) Inventors: Bernt Krantz, Vallda (SE); Patrik Viippola, Mölndal (SE)

(73) Assignee: CHINA EURO VEHICLE TECHNOLOGY AB, Gothenburg (SE)

(*) Notice: Subject to any disclaimer, the term of this patent is extended or adjusted under 35 U.S.C. 154(b) by 186 days.

(21) Appl. No.: 16/097,253

(22) PCT Filed: May 8, 2017

(86) PCT No.: PCT/CN2017/083460
§ 371 (c)(1),
(2) Date: Oct. 27, 2018

(87) PCT Pub. No.: WO2017/193888
PCT Pub. Date: Nov. 16, 2017

(65) Prior Publication Data
US 2019/0115576 A1 Apr. 18, 2019

(30) Foreign Application Priority Data
May 9, 2016 (SE) ...................... 1650622

(51) Int. Cl.
*B60K 1/04* (2019.01)
*H01M 2/10* (2006.01)
*B60R 16/04* (2006.01)

(52) U.S. Cl.
CPC ............. *H01M 2/1083* (2013.01); *B60K 1/04* (2013.01); *B60R 16/04* (2013.01); *H01M 2220/20* (2013.01)

(58) Field of Classification Search
CPC .. H01M 2/1083; H01M 2220/20; B60K 1/04; B60R 16/04
(Continued)

(56) References Cited

U.S. PATENT DOCUMENTS 3,053,336 A 9/1962 Zednik, Jr.
4,169,191 A 9/1979 Alt et al.
(Continued)

FOREIGN PATENT DOCUMENTS

CN 104022239 A 9/2014
CN 104576999 A * 4/2015
(Continued)

OTHER PUBLICATIONS

Translation of CN-104576999-A, accessed at www.espacenet.com, on Jun. 22, 2020. (Year: 2015).*
(Continued)

*Primary Examiner* — Paul N Dickson
*Assistant Examiner* — Hilary L Johns
(74) *Attorney, Agent, or Firm* — Tucker Ellis LLP

(57) ABSTRACT

A battery fastening system for fastening a battery (4) in a vehicle (60) comprises a battery tray (1) having a length direction (LD) and a width direction (WD), a first corner fastening device (7) and a second corner fastening device (8), wherein the second corner fastening device (8) is securable to the battery tray (1) in at least two different positions in the width direction (WD) for enabling fastening of batteries (4) with at least two different sizes in the width direction (WD). The battery fastening system further comprises a clamping element (9) for limiting movement of the battery (4) towards a second side (27) in the length direction (LD). The clamping element (9) is securable to the battery tray (1) in at least two different positions in the length direction (LD) for enabling fastening of batteries (4) with at
(Continued)

least two different sizes in the length direction (LD). In addition, it is also provided a corresponding method for fastening a battery in a vehicle.

17 Claims, 7 Drawing Sheets

(58) Field of Classification Search
USPC .................................................. 180/68.5
See application file for complete search history.

(56) References Cited

U.S. PATENT DOCUMENTS

| | | | | |
|---|---|---|---|---|
| 4,508,794 | A * | 4/1985 | Wright | H01M 2/1083 429/100 |
| 5,086,860 | A * | 2/1992 | Francis | H01M 2/1083 180/68.5 |
| 6,593,027 | B1 * | 7/2003 | Osterhart | H01M 2/0237 429/100 |
| 2013/0189555 | A1 * | 7/2013 | Munro | H01M 2/1077 429/100 |
| 2015/0236312 | A1 | 8/2015 | Koehler | |

FOREIGN PATENT DOCUMENTS

| | | | | |
|---|---|---|---|---|
| CN | 104576999 A | | 4/2015 | |
| CN | 204632832 U | * | 9/2015 | |
| CN | 204632832 U | | 9/2015 | |
| CN | 204668373 U | | 9/2015 | |
| DE | 10214048 A1 | | 10/2002 | |
| DE | 102005055110 A1 | | 5/2007 | |
| DE | 102013216555 A1 | | 2/2015 | |
| EP | 1561646 A1 | * | 8/2005 | .......... H01M 2/1083 |
| EP | 2999027 A1 | | 3/2016 | |
| JP | 56152068 U | | 11/1981 | |

OTHER PUBLICATIONS

Translation of CN 204632832U, accessed at www.espacenet.com, on Jun. 22, 2020. (Year: 2015).*
Translation of EP1561646A1, accessed at www.espacenet.com, on Jun. 22, 2020. (Year: 2005).*
International Search Report and Written Opinion from corresponding International Patent Application No. PCT/CN2017/083460, dated Aug. 4, 2017, 8 pages.
Swedish Search Report from corresponding Swedish Patent Application No. 1650622-2, dated Nov. 24, 2016, 3 pages.

* cited by examiner

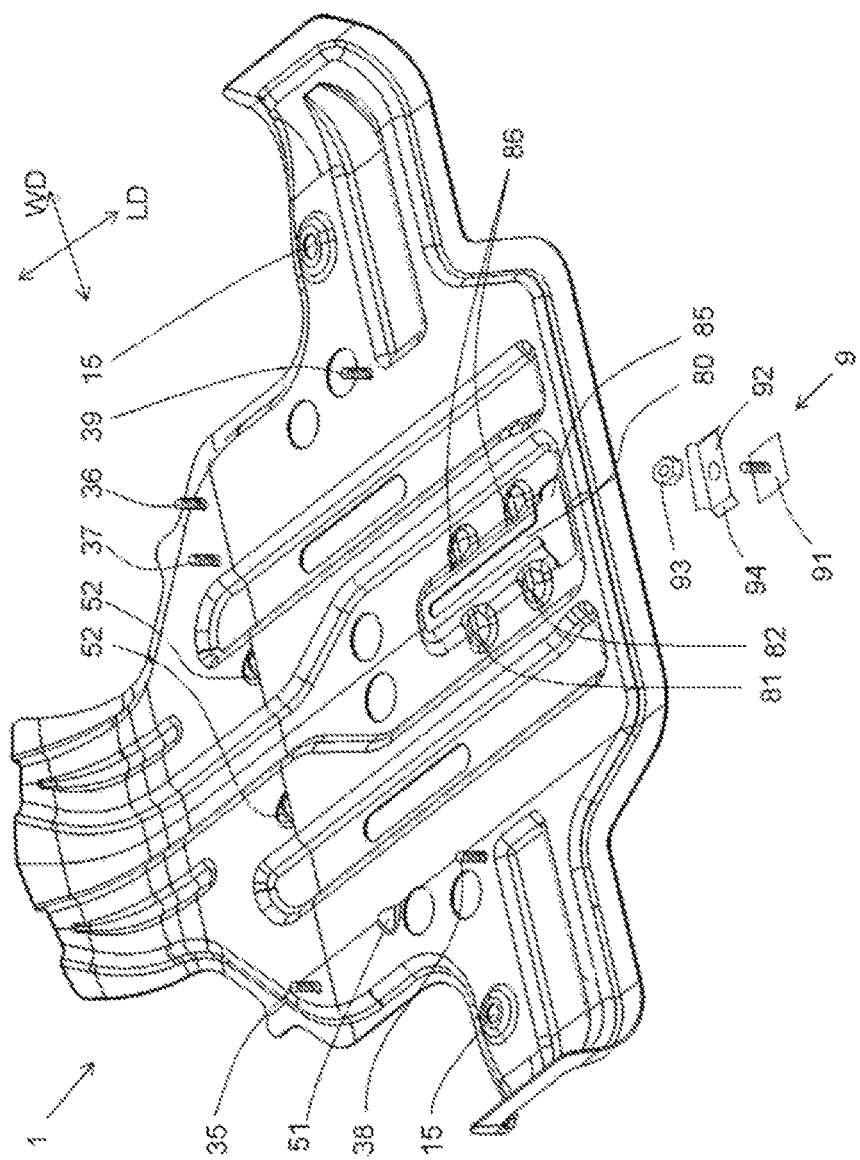

BATTERY FASTENING SYSTEM AND METHOD

TECHNICAL FIELD

This disclosure relates to a battery fastening system for fastening a battery in a vehicle, wherein the battery fastening system comprises a battery tray. The disclosure also relates to a method of fastening a battery in a vehicle. The system and method is suitable for fastening a battery in an automobile, but the system and method is also suitable for fastening a battery in working machines, trucks, busses, marine vessels, or the like. The battery may be for example a 12 volt, 24 volt or 48 volt starting, lightning and ignition battery, a battery for a kinetic energy recovery system, or a high voltage battery for a hybrid electric vehicle or a pure electric vehicle.

BACKGROUND

It is known for example from document DE102013216555A1 to use a battery tray for fastening a battery in a vehicle, and to use a slidable clamping element for providing a simplified fastening of the battery in the vehicle. Further, US2013/0189555A1 discloses a battery tray retaining system for a vehicle with a clamping member that can be slidably moved for fastening a battery to the battery tray.

While the known battery fastening systems are satisfactory for their intended use, such battery fastening systems are nonetheless susceptible to improvement.

SUMMARY

This section provides a general summary of the disclosure, and is not a comprehensive disclosure of its full scope or all of its features.

An object of the present disclosure is to provide a battery fastening system where the previously mentioned problem is at least partly avoided. This object is achieved by the features of the independent claims.

The disclosure concerns a battery fastening system for fastening a battery in a vehicle. The battery fastening system comprises:
- a battery tray having a length direction and a width direction;
- a first corner fastening device for limiting movement of the battery towards a first side in the length direction and towards a first side in the width direction, and for securing the battery to the battery tray,
- a second corner fastening device for limiting movement of the battery towards the first side in the length direction and towards a second side in the width direction, and for securing the battery to the battery tray, wherein the second corner fastening device is securable to the battery tray in at least two different positions in the width direction for enabling fastening of batteries with at least two different sizes in the width direction, and
- a clamping element for limiting movement of the battery towards a second side in the length direction, and for securing the battery to the battery tray, wherein the clamping element is securable to the battery tray in at least two different positions in the length direction for enabling fastening of batteries with at least two different sizes in the length direction, where each of the first corner fastening device and the second corner fastening device is arranged to be located at a unique corner of the battery.

The disclosure also concerns a method for fastening a battery in a vehicle. The method comprising:
- positioning the battery on a battery tray having a length direction and a width direction;
- limiting movement of the battery towards a first side in the length direction and towards a first side in the width direction and securing the battery to the battery tray by means of a first corner fastening device;
- limiting movement of the battery towards the first side in the length direction and towards a second side in the width direction and securing the battery to the battery tray by means of a second corner fastening device, wherein the second corner fastening device is securable to the battery tray in at least two different positions in the width direction for enabling fastening of batteries with at least two different sizes in the width direction, and where each of the first corner fastening device and the second corner fastening device is arranged to be located at a unique corner of the battery,
- limiting movement of the battery towards a second side in the length direction and securing the battery to the battery tray by means of a clamping element, wherein the clamping element is securable to the battery tray in at least two different positions in the length direction for enabling fastening of batteries with at least two different sizes in the length direction.

An advantageous technical effect of the described system and method is a simplified and more flexible battery fastening system and method in terms of battery size. This means that the battery fastening system and method according to the present disclosure is adaptable and thereby capable of receiving and fastening batteries of various sizes in the length and width direction using a single battery fastening system. Thereby, a single battery fastening system may be designed, manufactured, distributed and stored as spare part, while still being used for various battery sizes in one or more vehicle types or configurations. Through the location of the first and second corner fastening devices at corners of the battery, they are each arranged to limit the movement of the battery in both the length direction and width direction through interaction with a unique corner of the battery. In this way, the battery is efficiently secured to the battery tray by the first and second corner fastening devices together with the clamping element.

Further advantages are achieved by implementing one or several of the features of the dependent claims.

For example, the first corner fastening device and the second corner fastening device are essentially L-shaped clamping members arranged for engaging and limiting movement of the the battery. The L-shape provides an efficient and secure attachment in different directions of the battery to the battery tray.

According to an example, the clamping element may be slidingly moveable between the at least two different positions. A slidingly moveable clamping element enables simplified mounting of the battery because the clamping element may be pre-mounted on the battery tray and merely slidingly adjusted to a suitable clamping position. Moreover, a slidingly moveable clamping element enables simplified removal of the battery because complete removal of the clamping element is not necessary. A slidingly moveable clamping element also enables quick and simple adaptation of the clamping position for various battery sizes.

According to another example, the clamping element is slidingly interacting with an upper sloping surface of at least one upwardly directed projection. In this way, the clamping element efficiently clamps the battery into a secure position.

According to a further example, the battery tray may have an elongated slot extending in the length direction, and a fastener of the clamping element may be configured for being slidingly arranged within the elongated slot. An elongated slot enables simple adjustment of the position of the clamping element along the length of the elongated slot. Moreover, a battery tray comprising an elongated slot may be cost-efficiently manufactured by cutting or stamping the slot in a metal sheet.

According to a further example aspect of the disclosure, the battery tray comprises a locking arrangement and the clamping element comprises a cooperating locking arrangement for enabling positive locking of the clamping element to the battery tray in at least two different positions in the length direction. Positive locking of the clamping element provides a more secure locking of the clamping element, such that the risk of undesirable sliding of the clamping element along the slot is reduced. This is particularly relevant during accidents involving impact and high levels of deceleration or acceleration.

According to a further example aspect of the disclosure, the elongated slot is open in one longitudinal end thereof for enabling insertion of the fastener of the clamping element into the elongated slot while being in an assembled state with the clamping element. Mounting of the fastener and clamping element as an assembled unit simplifies handling and installation of the clamping element, because otherwise the screw and nut of the clamping element must first engaged with each other at site, which may be difficult due to little available space.

According to still a further example aspect of the disclosure, the open end of the elongated slot is located outside a surface area of the battery tray configured for receiving the battery, such that insertion of the fastener of the clamping element into the elongated slot is enabled after positioning of the battery on the surface area of the battery tray configured for receiving the battery. Having the open end of the elongated slot located outside of the surface area configured for receiving the battery enables both mounting and removal of the clamping element while having the battery installed in the vehicle. Thereby the clamping element will not interfere with the battery during installation or removal of the battery.

According to yet a further example aspect of the disclosure, the first corner fastening device is securable to the battery tray in a single position in the width direction, or at least two different positions in the width direction. A single position in the width direction enables use of abutment elements in the width direction for simplified installation of the battery. Two or more positions in the width direction enable increased adaptation of the battery tray in terms of mounting of different battery sizes.

Moreover, the first corner fastening device may be an individual element that is detachably or permanently secured to the battery tray. An individual detachable secured first corner fastening device enables a good flexibility in terms of fastening position and this battery size adaptability, and an individual permanently secured first corner fastening device enables improved robustness and simplified mounting of the battery on the battery tray. Alternatively, the first corner fastening device may be stationary and integrally formed with the battery tray, thereby providing cost-efficient manufacturing and robust solution.

Additionally, the first and/or second corner fastening device may be an individual element that is detachably secured to the battery tray by means of a threaded fastener. A threaded fastener provides reliable fastening while still enabling non-destructive detachment of the battery from the battery tray.

Furthermore, each of the first and/or second corner fastening device may be secured to the battery tray by means of a threaded stud bolt permanently attached to the battery tray in each position. A permanently attached threaded stud provides improved installation because the stud is pre-fixed and correctly mounted on the battery tray from the beginning, and handling of lose individual screw or similar threaded member may be omitted. Alternatively, each of the first and/or second corner fastening device may be secured to the battery tray by means of a threaded fastener configured to be secured to a threaded aperture in the battery tray or a threaded nut permanently attached to the battery tray in each position. This solution may in some circumstances be deemed more flexible in that it merely requires a few threaded or non-threaded holes in the battery tray and a cooperating threaded fastener. Moreover, no upwardly protruding threaded bolt permanently attached to the battery tray is required, such that the positioning of the battery may be deemed more flexible.

According to a further example, each of the first and second corner fastening device is securable to the battery tray in at least two different positions in the length direction. This arrangement enables mounting of at least two different battery size dimensions in the length direction.

According to a further example, the battery tray comprises abutment elements integrally formed with the battery tray for limiting movement of the battery towards a first side in the length direction and towards a first side in the width direction. The abutment elements are primarily arranged to function as initial guidance of the battery towards a desired battery mounting position during battery installation. The abutment elements may for example be upwardly directed cut-outs in the metal or plastic sheet forming the base part of the first corner fastening device. Thanks to the abutment elements the battery upon mounting thereof may first simply be pushed towards against the abutments elements, such that the correct mounting position is automatically accomplished. Thereafter securement of the battery by means of the first and second corner fastening devices and the clamping element is less complicated because the battery is located in the correct and final position. By having abutment elements limiting movement in both length direction and width direction a proper two-dimensional positioning of the battery in the plane of the battery tray may be accomplished.

According to a further example, the battery tray is made of sheet metal or plastic material. Sheet metal material provides a robust and cost-efficiently manufactured battery tray that may be welded to a metal chassis of the vehicle. Plastic material enables low material cost for manufacturing and low weight.

According to a further example, the battery tray is configured for being fastened in a spare wheel well of a vehicle. The spare wheel well has a relatively large space that may be used if no spare wheel is located in therein. The spare wheel well is also generally located in the rear of the vehicle, thereby enabling a more equal weight distribution between the front and rear wheel of a vehicle having front mounted engine.

Further areas of applicability will become apparent from the description provided herein.

BRIEF DESCRIPTION OF DRAWINGS

In the detailed description below reference is made to the following figure, in which:

FIG. 5 shows a three-dimensional view of a second example embodiment of the battery tray.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
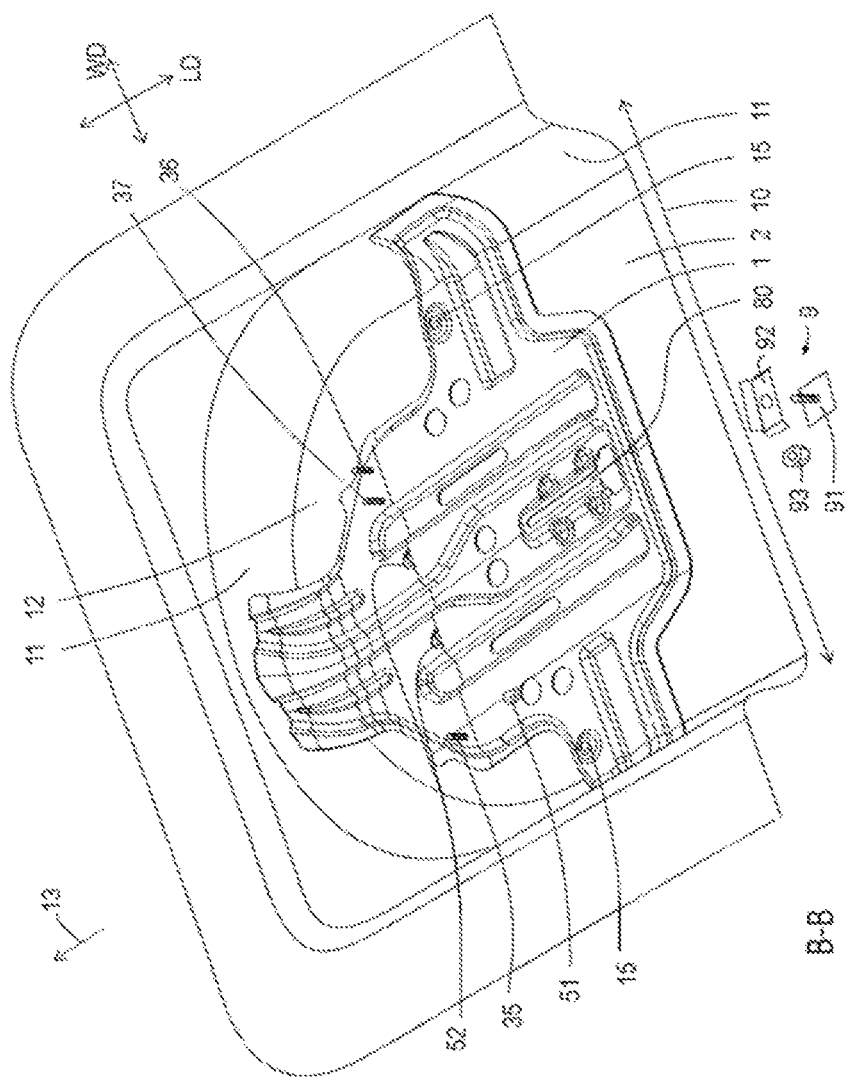
FIG. 1 shows a first example embodiment of a battery tray according to the disclosure installed in the spare wheel well.

With reference to FIG. 1 of the drawings, a three-dimensional view of a first example embodiment of battery fastening system for fastening a battery in a vehicle is disclosed. The battery fastening system comprises a battery tray 1 having a length direction LD and a width direction WD. In the example embodiment of FIG. 1 the battery tray 1 is located within a spare wheel well 2, which is schematically illustrated be means of a sectional view of the spare wheel well 2.

The battery tray 1 may be made entirely or partly of metal, such as sheet metal of steel, aluminium or the like. An entirely metal battery tray may be manufactured in a stamping or cutting process and subsequent pressing to accomplish the desired three-dimensional form. Alternatively, the battery tray 1 may be made of plastic material, such as through injection moulding. The plastic material may be a homogenous material, such as polypropylene or urethane. The plastic battery tray may also be reinforced using fibres, such as glass fibres.

The size of the battery tray 1 may be selected to fit in a spare wheel well 2 of a vehicle, such that the maximal extension 10 the width direction WD may be in the range of 20-100 centimetres, specifically in the range of 40-60 centimetres.

The spare wheel well 2 generally consists of a recess formed in the bottom surface of the luggage compartment. A cover plate normally covers the recess to accomplish a flat bottom surface in the luggage compartment. A spare wheel, or other equipment or vehicle components may be stored in the spare wheel well 2. The spare wheel well 2 may have a generally cylindrical or rectangular form, or a combination thereof, and have one or more inner side walls 11 and an inner bottom surface 12.

In the example embodiment of FIG. 1 the battery tray 2 contacts the inner side walls 11 in the width direction WD and towards a front 13 in the length direction LD. This contact improves the fastening of the battery tray 1 within the spare wheel well 2, because forces caused by sudden acceleration or deceleration of the battery and battery tray can be conveyed into the vehicle chassis by means of this contact. Additional fastening means is normally required for safe and permanent fastening of the battery tray 1 to the vehicle, such as for example threaded members that may penetrated the battery tray via holes 15 in the battery tray 1 and be engaged with the underlying inner bottom surface 12 of the spare wheel well 2. Alternatively, the battery tray 1 may be welded or adhered or otherwise securely fastened to any of the inner side or bottom walls 11, 12 of the spare wheel well 2.

Figure 2:
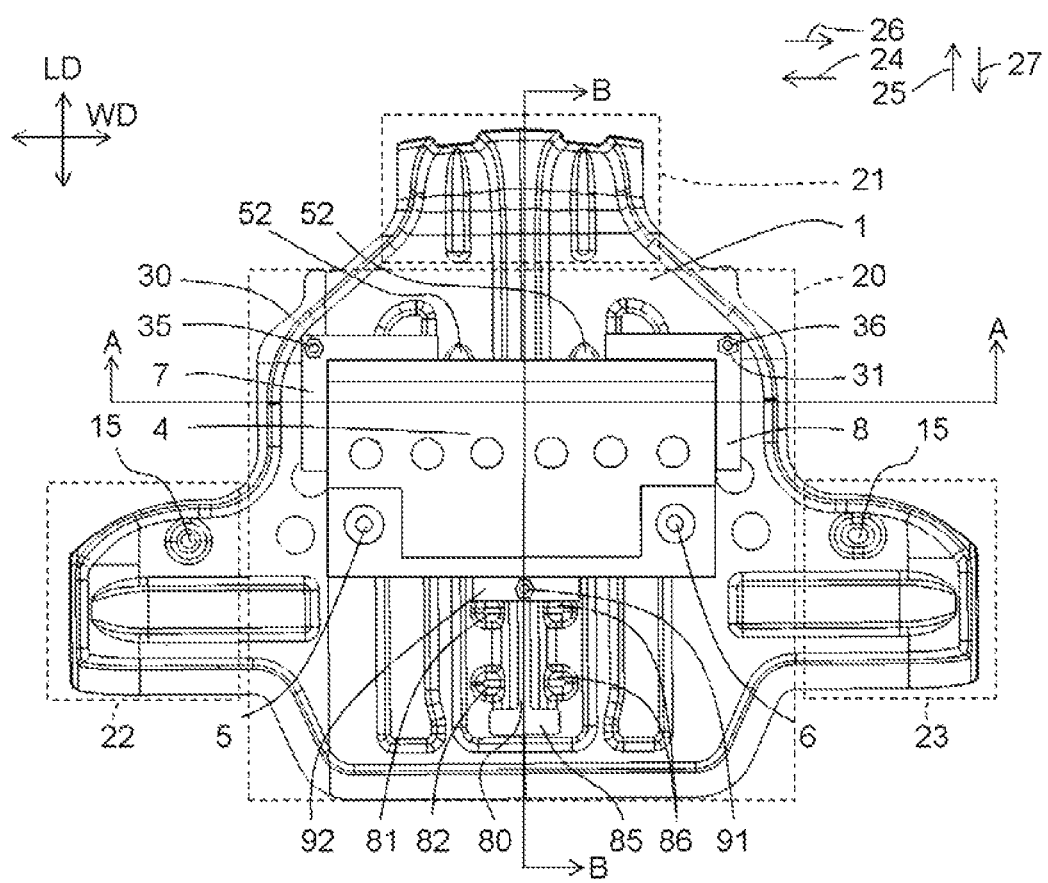
FIG. 2 shows a top view of the battery tray of FIG. 1 including a first size battery.

With reference to FIG. 2 which shows a top view of the battery tray of FIG. 1, the battery tray 1 comprises a rectangular main region 20 and three arm regions 21, 22, 23 protruding in different directions from the main region 20. The battery tray of the first arm region 21 protrudes in the length direction LD towards a front of the battery tray 1 is and is configured for abutting or engaging the inner side wall 11 of the spare wheel well 2. The battery tray of a second arm region 22 protrudes towards a first side 24 in the width direction WD and is configured for abutting or engaging the inner side wall 11 of the spare wheel well 2, and the battery tray of a third arm region 23 protrudes opposite the first side 24 in the width direction WD and is configured for abutting or engaging the inner side wall 11 of the spare wheel well 2.

The arm regions 21, 22, 23 of the battery tray may have an upwardly folded or curved shape to conform a rounded transition between the inner side walls 11 and the inner bottom surface 12 of the spare wheel well 2.

The battery tray of the present disclosure is however not restricted to being located in the spare wheel well but alternatively may be located anywhere in the vehicle, such as in the engine compartment or luggage compartment.

The battery may be for example a 12 volt, 24 volt or 48 volt starting, lightning and ignition battery, a battery for a kinetic energy recovery system, or a high voltage battery for a hybrid electric vehicle or a pure electric vehicle. The type of vehicle includes automobile, working machine, truck, buss, marine vessel, or the like.

The battery is arranged to be removable secured to on an upper surface of the battery tray 1, and the battery tray is arranged to be permanently fastened to the vehicle.

An example of a securement of a first size battery is schematically illustrated in FIG. 2. FIG. 2 shows a top view of the example battery tray of FIG. 1 and with a battery 4 positioned in the upper surface thereof. The battery comprises a positive electrical connection 5 and a negative electrical connection 6.

The battery fastening system comprises a first corner fastening device 7, a second corner fastening device 8, and a clamping element 9 for securing the battery 4 to the battery tray 1. These parts are distributed around the periphery of the battery 4 for enabling secure and removable fastening of the battery 4 to the battery tray 1.

According to the example embodiment of FIG. 2, the first corner fastening device 7 is an individual member that is detachably secured to the battery tray 1 by means of a threaded fastener in form of a threaded nut 30 engaging a first threaded stud bolt 35 that is permanently attached to the battery tray 1. Similarly, the second corner fastening device 8 is an individual member that is detachably secured to the battery tray 1 by means of a threaded fastener in form of a threaded nut 31 engaging a second threaded stud bolt 36 that is permanently attached to the battery tray 1.

The first and second corner fastening devices 7, 8 are thus provided with at least one aperture extending the vertical direction VD and arranged to receive the first and second threaded stud bolts 35, 36 respectively. The length of the threaded stud bolts 35, 36 and the thickness of the first and second corner fastening devices 7, 8 in the vertical direction VD are selected such that a portion of the threaded stud bolts 35, 36 protrude above the first and second corner fastening devices 7, 8 with an extent that allows the threaded nuts 30, 31 to be threadingly engaged with the threaded stud bolts 35, 36 and to clamp a foot 41 of the battery 4.

Each of the first and second corner fastening devices 7, 8 are essentially L-shaped clamping members that are arranged to be located at a unique corner of the battery. The clamping members are arranged for limiting movement of the battery 4. Moreover, as schematically illustrated in sectional view A-A in FIG. 4a, the battery normally comprises a foot 41 protruding sideways from the side wall of the battery 4 adjacent a bottom side of the battery 4. This foot 41 is provided for enabling securement of the battery 4. Consequently, the L-shaped clamping members are arranged for engaging the foot 41 of the battery and thereby pressing the battery against the upper surface of the battery tray 1. Thus, each of the first corner fastening device 7 and the second corner fastening device 8 is arranged to be located at a unique corner of the battery 4, and the essentially L-shaped structure secures that each of the first and second corner fastening devices 7, 8 is arranged to limit the movement of the battery 4 in both the length direction LD and width direction WD through interaction with a unique corner of the battery, as shown in FIG. 2. In this way, the battery 4 is efficiently secured to the battery tray 1 by the essentially L-shaped clamping members together with the clamping element 9.

The first corner fastening device 7 is arranged for limiting movement of the battery towards a first side 25 in the length direction LD, herein also referred to as the front or front side in the length direction. The first corner fastening device 8 is also arranged for limiting movement of the battery towards the first side 24 in the width direction and for securing the battery 4 to the battery tray 1.

The second corner fastening device 8 is arranged for limiting movement of the battery 4 towards the first side 25 in the length direction LD and towards a second side 26 in the width direction WD and for securing the battery 4 to the battery tray 1.

The use of threaded stud bolts 35, 36 and corresponding threaded nuts 30, 31 for securing the first and second corner fastening devices 7, 8 to the battery tray 1 enables a flexible and adaptable battery fastening system that may adapt to different battery sizes merely by providing the battery tray with at least one additional threaded stud bolt. In fact, each additional threaded stud bolt represents an additional position of the first and second corner fastening devices 7, 8. The additional cost for permanently fasten a few additional threaded stud bolts on the battery tray is very low compared with the advantage in terms of increased flexibility for fastening different battery sizes. Moreover, without said flexibility, a plurality of different battery trays, each specifically designed for a unique battery size, may have to be designed, manufactured, stored and handled, thereby resulting in increased overall cost.

Figure 3:
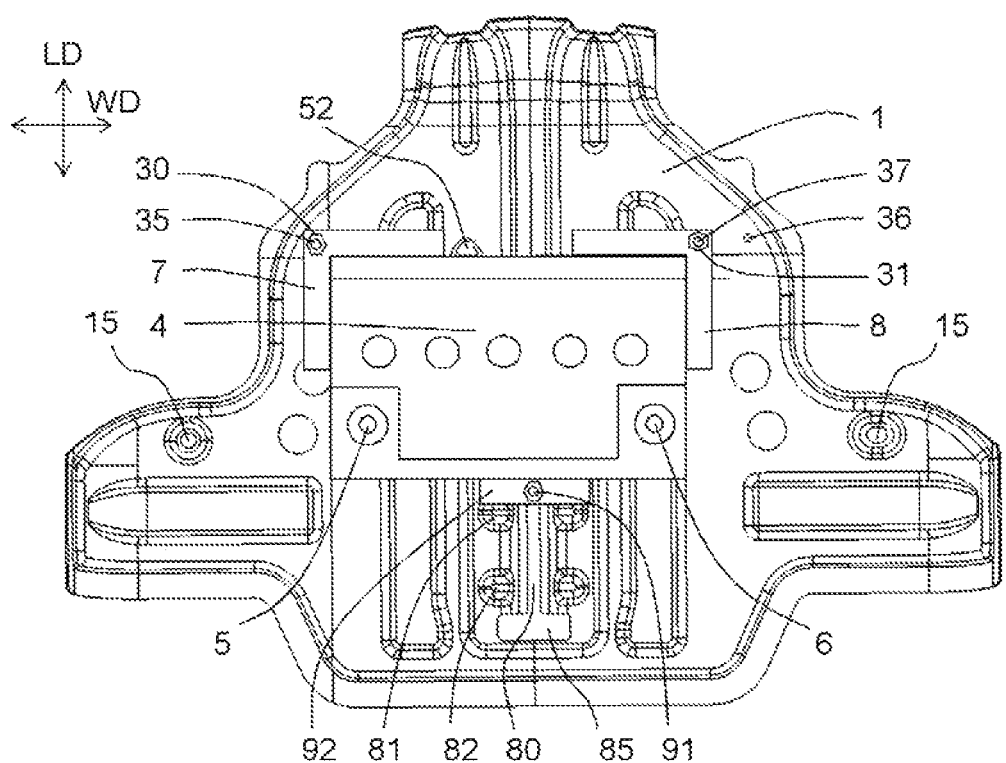
FIG. 3 shows a top view of the battery tray of FIG. 1 including a second size battery.

The first example embodiment of FIG. 1-3 comprises one additional threaded stud bolt, namely a third threaded stud bolt 37. Thereby the second corner fastening device may be secured to the battery tray in at least two different positions in the width direction WD for enabling fastening of batteries with at least two different sizes in the width direction. A second size battery 4, which is smaller than the first size battery 4, is schematically illustrated being fastened to the battery tray 4 in FIG. 3, wherein the first corner fastening device 7 is detachably secured to the battery tray 1 by means of threaded nut 30 engaging the first threaded stud bolt 35, and the second corner fastening device 8 is detachably secured to the battery tray 1 by means of threaded nut 31 engaging the third threaded stud bolt 37 that is permanently attached to the battery tray 1.

Although not explicitly disclosed also the first corner fastening device may alternatively be securable to the battery tray in at least two different positions in the width direction using at least two individual threaded stud bolts.

Moreover, each of the first and/or second corner fastening devices 7, 8 may alternatively be secured to the battery tray by means of a threaded fastener configured to be secured to a threaded aperture in the battery tray or a threaded nut permanently attached to the battery tray in each position, or the like. The expression "in each position" herein refers to each intended fastening position of the first and second corner fastening devices 7, 8.

Having each of the first and second corner fastening devices 7, 8 as individual L-shaped members is advantageous because this design allows said two corner fastening devices 7, 8 to secure the battery in the both width direction and towards one side on the length direction. If any of the first and second corner fastening devices 7, 8 was made of two members, each of which engaged an unique side wall of the battery, more individual members has to be handled and installed, thereby making the installation more complex and time consuming.

According to a further example variation of the design, the first corner fastening device may be an individual member that is permanently secured to the battery tray, for example be means of welding or adhesive. Still more alternatively, the first corner fastening device may be stationary and integrally formed with the battery tray, for example by means of an upwardly bent cut-out in the battery tray. An advantage with a permanently secured first corner fastening device is simplified installation of the battery because the first corner fastening device requires no manual handling. A disadvantage with a permanently secured first corner fastening device is however reduced flexibility in terms of battery size flexibility.

The clamping element 9 of the first example embodiment shown in FIG. 1-3 is arranged for securing the battery 4 to the battery tray 1 in combination with the first and second corner fastening devices 7, 8. The clamping element 9 is arranged for limiting movement of the battery towards a second side 27 in the length direction LD and for securing the battery to the battery tray 1.

The example clamping element 9 of FIG. 1 comprises three individual components; a fastener 91 in form of a threaded stud bold attached to plate, a clamping bracket 92 and a nut 93 that is arranged to threadingly engage the threaded stud bolt 91. The example clamping element 9 is arranged for cooperating with an elongated slot 80 of the battery tray 1. The elongated slot 80 extends in the length direction LD, and the fastener 91 of the clamping element 9 is configured for being slidingly arranged within the elongated slot 80.

The slidingly arrangement of the clamping element 9 in the slot 80 enables the clamping element to be securable to the battery tray in at least two different positions in the length direction, such that fastening of batteries with at least two different sizes in the length direction is enabled. The clamping element 9 is consequently slidingly moveable between the at least two different positions.

In the example first embodiment of the battery fastening system the battery tray comprises two different positions for the clamping element 9 in the length direction LD. The clamping element is located in the first position in FIG. 2 and in a second position in FIG. 6 as will be discussed later in the text. Each position is characterised in that a vertical upwardly directed projection 81, 82 is provided next to the clamping element in the length direction LD for the purpose of preventing the clamping element to accidentally slide towards the second side 27 in the length direction LD, which sliding may result in the battery coming lose. Each upwardly directed projection 81, 82 thus form a locking arrangement that cooperates with the clamping bracket 92 of the clamping element, wherein the clamping bracket 92 forms a cooperating locking arrangement for enabling positive locking of the clamping element to the battery tray in said two different positions in the length direction.

Figure 6:
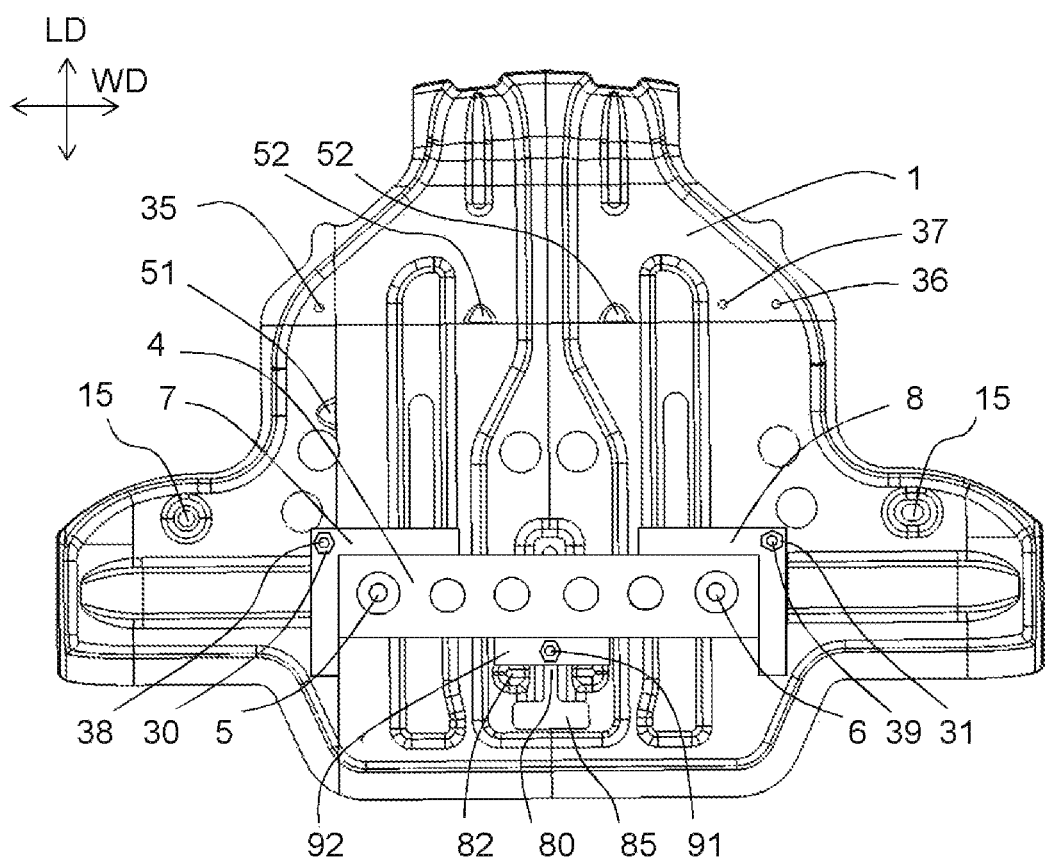
FIG. 6 shows a top view of the battery tray of FIG. 5 including a third size battery.

The clamping bracket 92 cooperates with the first vertical upwardly directed projection 81 in the first position as shown in FIG. 2, and the clamping bracket 92 cooperates with the second vertical upwardly directed projection 82 in the second position as shown in FIG. 6.

As shown in the figures, the battery tray 1 may be provided with two first upwardly directed projections 81 and two second upwardly directed projections 82. However, the number of upwardly directed projections 81, 82 may be chosen to fit the specific design of the battery tray 1. It may be possible to have only one first upwardly directed projection 81 and one second upwardly directed projection 82. As an alternative, the battery tray may be provided with three or more first and second upwardly directed projections 81, 82 respectively.

Figure 4B:
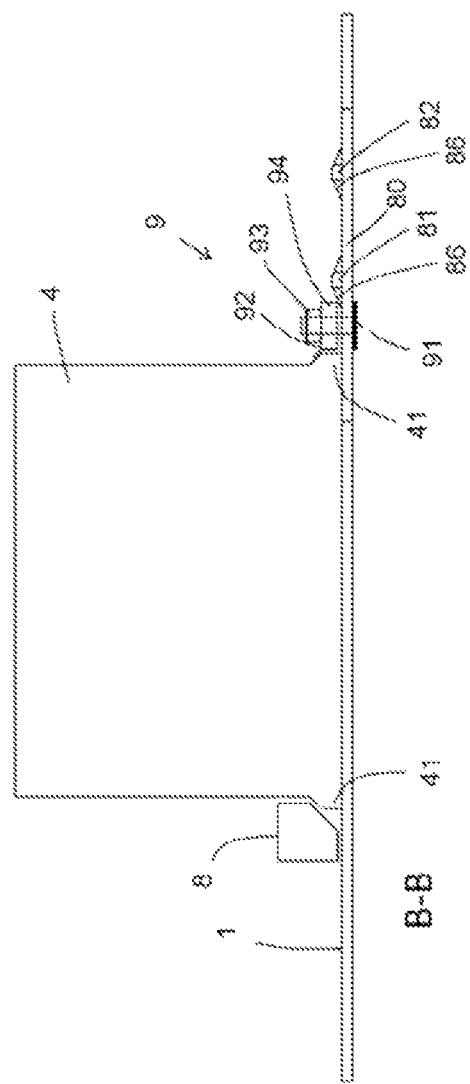
FIG. 4b shows a schematic illustration of a section B-B, as indicated in FIG. 2, through the battery, battery tray, second corner fastening device and clamping element.
Figure 4A:
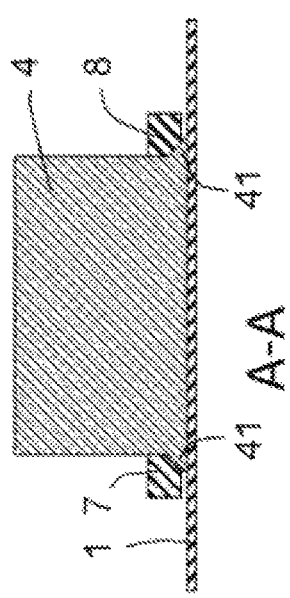
FIG. 4a shows a schematic illustration of a section A-A, as indicated in FIG. 2, through the battery, battery tray and first and second corner fastening devices.

The first and second upwardly directed projections 81, 82 may be provided with upper sloping surfaces 86, as shown in FIGS. 2 and 4b. The upper sloping surfaces 86 may be arranged as an inclined plane arranged on the side of the first and second upwardly directed projections 81, 82, which is directed towards the battery 4. The upper sloping surfaces 86 may extend from an upper part of the first and second upwardly directed projections 81, 82 in a plane towards the upper surface of the battery tray 1 and are arranged to cooperate with the clamping bracket 92 of the clamping element 9.

As shown in FIG. 4b, the upper sloping surfaces 86 are cooperating with a downwardly projecting flange 94 or similar arrangement of the clamping bracket 92 so that the clamping bracket 92 efficiently clamps the battery 4 into a secure position. When the clamping element 9 with the threaded stud bolt 91, clamping bracket 92 and nut 93 are positioned in a mounting position in relation to the battery 4, the flange 94 will interact with the upper sloping surfaces 86. As described above, the clamping element 9 is configured for being slidingly arranged within the elongated slot 80 of the battery tray 1. When the nut 93 is tightened, the upper sloping surfaces 86 will through the sliding arrangement of the clamping element 9 in the elongated slot 80 push the clamping element 9 via the flange 94 towards the battery 4 for an efficient fastening of the battery 4 to the battery tray 1. The clamping element 9 is arranged to be slidingly interacting with the upper sloping surface 86 of at least one upwardly directed projection 81, 82. In this way, the battery 4 will interact with the first and second corner fastening devices 7, 8, as well as the clamping element 9, so that the battery 4 is securely attached to the battery tray 1.

The elongated slot 80 preferably comprises an open end 85 in one longitudinal end thereof, as illustrated in FIGS. 1-3, for enabling insertion of the fastener 91 of the clamping element into the elongated slot 80 while being in an assembled state with the remaining parts of the clamping element 9. Thereby complicated and time consuming assembly of the clamping element 9 inside the slot 80 is avoided. Instead, the clamping element 9 may simply be inserted into the slot 80 in assembled state and subsequently pushed to the desired clamping position for secure mounting of the battery.

Moreover, the open end 85 of the elongated slot 80 is preferably located outside a surface area of the battery tray 1 configured for receiving the battery 4. Thereby, insertion of the fastener 91 of the clamping element 9 into the elongated slot 80 is enabled also after positioning of the battery on the surface area of the battery tray configured for receiving the battery. The surface area of the battery tray 1 configured for receiving the battery 4 herein refers to the surface area of the battery tray 1 occupied by the battery 4 in the intended securement position of that battery 4. This arrangement thus allows installation of the clamping element 9 on the battery tray 1 also after the battery has been positioned on the tray, thereby avoiding that the clamping element 9 must be installed on the battery tray 1 before installation of the battery 4, and thus potentially also avoiding that the installation of the battery 4 on the battery tray 1 does not negatively interfere with the clamping element 9.

According to the first example embodiment of the battery fastening system the battery tray further comprises abutment elements 51, 52 for simplifying positioning of the battery in the correct installation position. Abutment elements 51, 52 are particularly advantageous when the first and second corner fastening devices 7, 8 are detachable from the battery tray 1 because this means that the battery 4 may be installed and pushed to the correct installation position without any guidance of the first and second corner fastening devices 7, 8.

The abutment elements 51, 52 serve as guidance devices for enabling quick and easy positioning of the battery 4 at correct installation position. The abutment elements 51, 52 are preferably positioned on the battery tray 1 such as to be engaged by two neighbouring side walls of the battery 4. Thereby the abutment elements 51, 52 would for example limit movement of the battery 4 towards a first side 25 in the length direction LD and towards a first side 24 in the width direction WD. A vehicle assembly worker having the task of mounting the battery in the vehicle would benefit from this feature because the worker merely has to put down the battery 4 on the battery tray 1, push the battery 4 towards a first side 25 in the length direction LD and towards a first side 24 in the width direction WD until the battery 4 abuts the abutment elements 51, 52, and thereafter install and tighten the first and second corner fastening devices 7, 8 and the clamping element 9.

The abutment elements 51, 52 are preferably integrally formed with the battery tray 1, for example by means of upwardly projecting cut-outs in the material of the of the battery tray 1. Alternatively, the abutment elements 51, 52 may be individual parts that are permanently or detachable secured to the battery tray 1.

In the first example embodiment shown in FIG. 1-3 a first abutment element 51 limits movement of the battery 4 towards a first side 24 in the width direction WD, and two abutment elements 52 limits movement of the battery towards a first side 25 in the length direction LD.

A second example embodiment of the battery fastening system according to the disclosure is disclosed with reference to FIG. 5 and FIG. 6. In the example embodiment each of the first and second corner fastening device 7, 8 is securable to the battery tray in two different positions in the length direction LD. This is accomplished by providing the battery tray with additional threaded stud bolts. A fourth threaded stud bolt 38 is provided displaced in the length direction from the first threaded stud bolt 35, and a fifth threaded stud bolt 39 is provided displaced in the length direction from the second threaded stud bolt 36.

A relatively thin battery in the length direction LD may thereby additionally be secured to the battery tray using available threaded stud bolts, wherein the first corner fastening device 7 is detachably secured to the battery tray 1 by means of the threaded nut 30 engaging the fourth threaded stud bolt 38 that is permanently attached to the battery tray 1, wherein the second corner fastening device 8 is detachably secured to the battery tray 1 by means of the threaded nut 31 engaging the fifth threaded stud bolt 39 that is permanently attached to the battery tray 1, and wherein the clamping element 9 is located in the second position, i.e. the position where the clamping bracket 92 cooperates with the second vertical upwardly directed projection 82 for positive locking of the clamping element 9.

Figure 7:
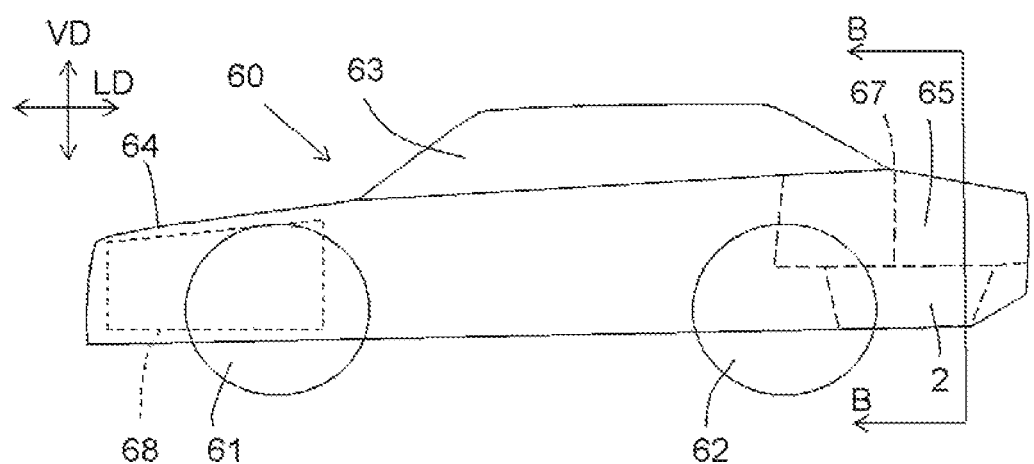
FIG. 7 shows an example vehicle having a spare wheel well.

With reference to FIG. 7, an example vehicle 60 is schematically illustrated. The example vehicle comprises front wheels 61, rear wheels 62, a passenger compartment 63, and front hood 64 and a rear trunk 65 as luggage comparting for transporting goods. In the example vehicle a spare wheel well 2 is provided under the floor 67 of the rear trunk 65.

In the first and second example embodiments disclosed above the battery tray 1 is configured for being fastened in a spare wheel well 2 of a vehicle 60. The battery tray 1 may however alternatively be fastened in the engine compartment 68 or the passenger compartment 63.

Figure 8:
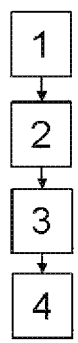
FIG. 8 shows schematically the steps of a method for fastening a battery in a vehicle.

The disclosure also concerns a method for fastening a battery in a vehicle. The method comprises four main steps, as schematically illustrated in FIG. 8. The first step includes positioning the battery on the battery tray, which has a length direction and a width direction. A second step includes limiting movement of the battery towards a first side in the length direction and towards a first side in the width direction and securing the battery to the battery tray by means of a first corner fastening device. The first corner fastening device 7 may thus be used for clamping the foot 41 of the battery 4. A third step includes limiting movement of the battery towards the first side in the length direction and towards a second side in the width direction and securing the battery to the battery tray by means of a second corner fastening device, wherein the second corner fastening device is securable to the battery tray in at least two different positions in the width direction for enabling fastening of batteries with at least two different sizes in the width direction. The mounting means, such a threaded stud bolts, provided on the battery tray for enabling said two positions are available in the battery tray. A final fourth step subsequently includes limiting movement of the battery towards a second side in the length direction and securing the battery to the battery tray by means of a clamping element, wherein the clamping element is securable to the battery tray in at least two different positions in the length direction. Thereby fastening of batteries with at least two different sizes in the length direction is enabled. The order of second and third may be interchanged when deemed suitable.

The first and second example embodiments of the battery fastening system merely represent two alternative designs and many variations are possible although not explicitly disclosed. For example, the position and number of threaded stud bolts may vary according to the specific circumstances and need. Moreover, the form and shape of batter tray may be circular, rectangular, or any other shape suitable for carrying and securing a battery thereon. Furthermore, the design of first and/or second corner fastening devices 7, 8 may change according to the specific needs. Finally, the length direction LD of the battery tray 1 corresponds to the front-rear direction of the vehicle, and the width direction WD corresponds to the left side-right side direction of the vehicle.

Reference signs mentioned in the claims should not be seen as limiting the extent of the matter protected by the claims, and their sole function is to make claims easier to understand.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

The invention claimed is:

1. A battery fastening system for fastening a battery in a vehicle, the battery fastening system comprises:
   a battery tray having a length direction and a width direction, wherein the battery tray is configured to be fastened to the vehicle;
   a first corner fastening device located at a first corner of the battery, the first corner fastening device configured to limit movement of the battery towards a first side of the battery tray in the length direction and towards a first side of the battery tray in the width direction, and further configured to secure the battery to the battery tray,
   a second corner fastening device separate from the battery tray and located at a second corner of the battery different than the first corner of the battery, the second corner fastening device configured to limit for limiting movement of the battery towards the first side of the battery tray in the length direction and towards a second side of the battery tray in the width direction, and further configured to secure the battery to the battery tray, wherein the second corner fastening device is securable to the battery tray in at least two different positions in the width direction for fastening of batteries with at least two different sizes in the width direction, a clamping element configured to limit movement of the battery towards a second side of the battery tray in the length direction, and further configured to secure the battery to the battery tray, wherein the clamping element is securable to the battery tray in at least two different positions in the length direction for fastening of batteries with at least two different sizes in the length direction of the battery tray, wherein the first corner fastening device has a first battery engaging surface normal to the length direction that engages a side of the battery normal to the length direction and a second battery engaging surface normal to the width direction that engages a first side of the battery normal to the width direction, and the second corner fastening device has a first battery engaging surface normal to the length direction that engages the side of the battery normal to the length direction and a second battery engaging surface normal to the width direction that engages a second side of the battery normal to the width direction;

wherein the first and second corner fastening devices are further configured to engage a foot of the battery to press the battery against an upper surface of the battery tray, the foot protruding laterally from at least one side of the battery adjacent a bottom of the battery.

2. The battery fastening system according to claim 1, wherein the first corner fastening device and the second corner fastening device each are essentially L-shaped clamping members in a plane that includes the length and width directions.

3. The battery fastening system according to claim 1, wherein the clamping element is slidingly moveable between the at least two different positions.

4. The battery fastening system according to claim 3, wherein the clamping element slidably interacts with an upper sloping surface of at least one upwardly directed projection of the battery tray.

5. The battery fastening system according to claim 1, wherein the battery tray has an elongated slot extending in the length direction, and wherein a fastener of the clamping element is configured for being slidingly arranged within the elongated slot.

6. The battery fastening system according to claim 1, wherein the battery tray comprises a locking arrangement and the clamping element comprises a cooperating locking arrangement for enabling positive locking of the clamping element to the battery tray in at least two different positions in the length direction.

7. The battery fastening system according to claim 5, wherein the elongated slot is open in one longitudinal end thereof for enabling insertion of the fastener of the clamping element into the elongated slot while being in an assembled state with the clamping element.

8. The battery fastening system according to claim 5, wherein an open end of the elongated slot is located outside a surface area of the battery tray configured for receiving the battery, such that insertion of the fastener of the clamping element into the elongated slot is enabled after positioning of the battery on the surface area of the battery tray configured for receiving the battery.

9. The battery fastening system according to claim 1, wherein the first corner fastening device is securable to the battery tray in a single position in the width direction, or at least two different positions in the width direction.

10. The battery fastening system according to claim 1, wherein the first corner fastening device is an individual member that is detachably or permanently secured to the battery tray, or wherein the first corner fastening device is stationary and integrally formed with the battery tray.

11. The battery fastening system according to claim 1, wherein the first and/or second corner fastening device is an individual member that is detachably secured to the battery tray by a threaded fastener.

12. The battery fastening system according to claim 11, wherein each of the first and/or second corner fastening device is secured to the battery tray by means of a threaded stud bolt permanently attached to the battery tray in each position, or wherein each of the first and/or second corner fastening device is secured to the battery tray by means of a threaded fastener configured to be secured to a threaded aperture in the battery tray or a threaded nut permanently attached to the battery tray in each position.

13. The battery fastening system according to claim 1, wherein each of the first and second corner fastening device is securable to the battery tray in at least two different positions in the length direction.

14. The battery fastening system according to claim 1, wherein the battery tray comprises abutment elements integrally formed with the battery tray for limiting movement of the battery towards a first side in the length direction and towards a first side in the width direction.

15. The battery fastening system according to claim 1, wherein the battery tray is made of sheet metal or plastic material.

16. The battery fastening system according to claim 1, wherein the battery tray is configured for being fastened in a spare wheel well of a vehicle.

17. A method for fastening a battery in a vehicle, the method comprising
fastening a battery tray to the vehicle, wherein the battery tray has a length direction and a width direction;
positioning the battery on the battery tray;
limiting movement of the battery towards a first side of the battery tray in the length direction and towards a first side of the battery tray in the width direction by securing the battery to the battery tray with a first corner fastening device at a first corner of the battery;
limiting movement of the battery towards the first side of the battery tray in the length direction and towards a second side of the battery tray in the width direction by securing the battery to the battery tray with a second corner fastening device that is separate from the battery tray at a second corner of the battery that is different than the first corner of the battery, wherein the second corner fastening device is securable to the battery tray in at least two different positions in the width direction for fastening of batteries with at least two different sizes in the width direction,
wherein the first corner fastening device has a first battery engaging surface normal to the length direction that engages a side of the battery normal to the length direction and a second battery engaging surface normal to the width direction that engages a first side of the battery normal to the width direction, and the second corner fastening device has a first battery engaging surface normal to the length direction that engages the side of the battery normal to the length direction and a second battery engaging surface normal to the width direction that engages a second side of the battery normal to the width direction, and wherein the first and second corner fastening devices are further configured to engage a foot of the battery to press the battery against an upper surface of the battery tray, the foot protruding laterally from at least one side of the battery adjacent a bottom of the battery, and limiting movement of the battery towards a second side of the battery tray in the length direction and securing the battery to the battery tray with a clamping element, wherein the clamping element is securable to the battery tray in at least two different positions in the length direction for fastening of batteries with at least two different sizes in the length direction.

* * * * *